(12) United States Patent
Mitani

(10) Patent No.: US 8,824,809 B2
(45) Date of Patent: Sep. 2, 2014

(54) IMAGE PROCESSING APPARATUS AND CONTROL METHOD THEREOF

(75) Inventor: Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/091,798

(22) Filed: Apr. 21, 2011

(65) Prior Publication Data

US 2011/0262046 A1 Oct. 27, 2011

(30) Foreign Application Priority Data

Apr. 27, 2010 (JP) ................................ 2010-101896

(51) Int. Cl.
*G06K 9/62* (2006.01)
*G06K 9/00* (2006.01)
*G06K 9/03* (2006.01)

(52) U.S. Cl.
CPC ............ *G06K 9/00677* (2013.01); *G06K 9/036* (2013.01); *G06K 9/033* (2013.01)
USPC ............ 382/224; 382/225; 382/226; 382/227

(58) Field of Classification Search
CPC ............ G06K 9/00664; G06K 9/6218; G06K 9/6282; G06K 9/03; G06F 17/30265
USPC ................................. 382/224–227
See application file for complete search history.

(56) References Cited

U.S. PATENT DOCUMENTS

2006/0004698 A1* 1/2006 Pyhalammi et al. .............. 707/2
2009/0307222 A1* 12/2009 Matraszek et al. ................ 707/7

FOREIGN PATENT DOCUMENTS

JP 2003-018516 1/2003
JP 2008-011480 A 1/2008

OTHER PUBLICATIONS

The above reference was cited in a Mar. 27, 2014 Japanese Office Action, which is not enclosed, that issued in Japanese Patent Application No. 2010-101896.

* cited by examiner

*Primary Examiner* — Ruiping Li
(74) *Attorney, Agent, or Firm* — Cowan, Liebowitz & Latman, P.C.

(57) ABSTRACT

A sort-out cycle such as a judgment of three levels of "usable", "unusable", and "reserve" is made to images and, when the judgment of all images is completed, the judgment of the three levels is made again to the "reserve" images is repeated. The number of sort-out cycle times in which the judgment is made is applied as an evaluation to the images which are finally determined as "usable".

12 Claims, 17 Drawing Sheets

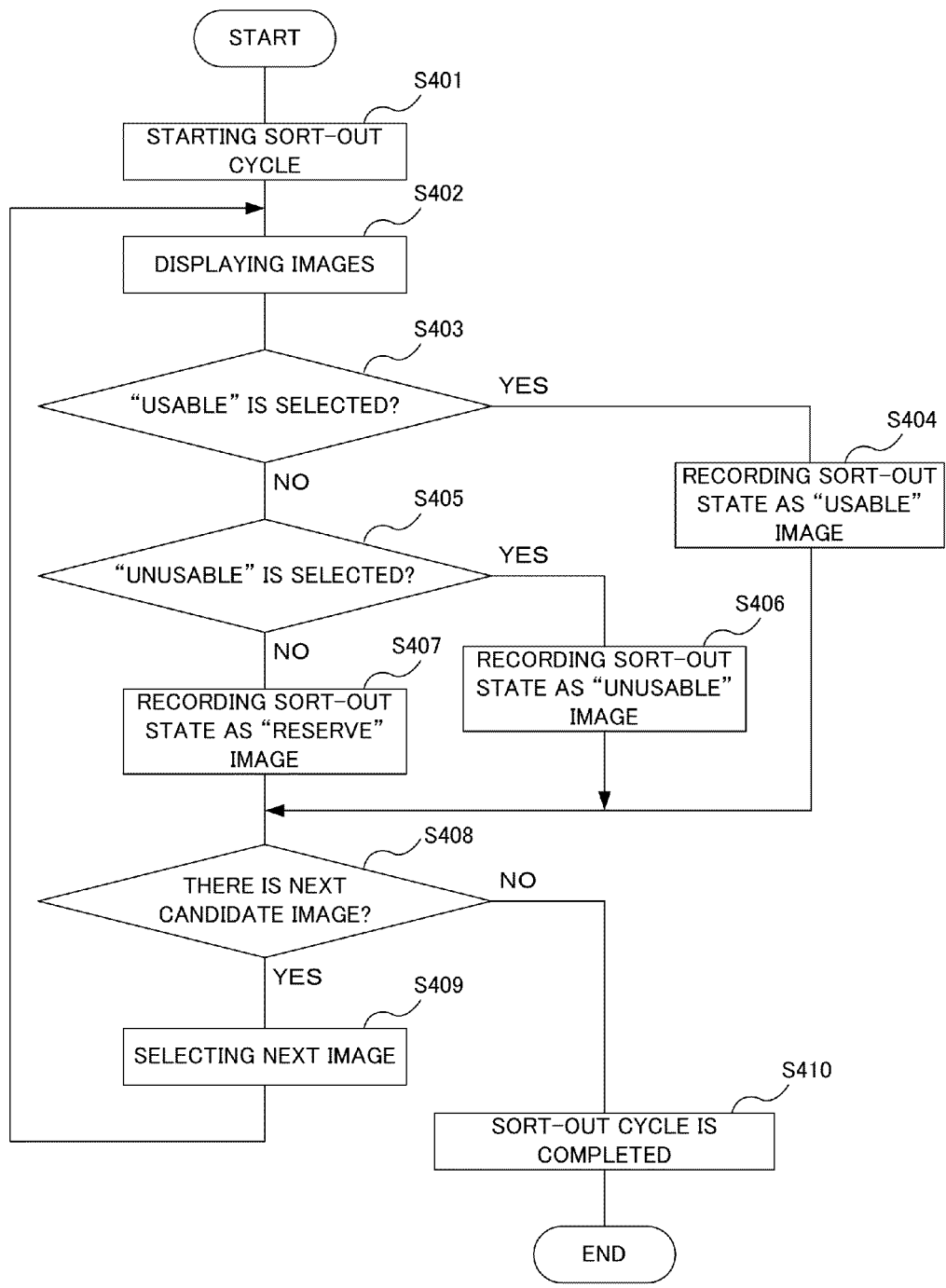

FIG. 14A

| SORT-OUT RESULT (1401) | CYCLE (1402) | EVALUATION (1403) | |
|---|---|---|---|
| USABLE (1404) | 1 | ★★★★★ | 1407 |
| | 2 | ★★★★ | 1408 |
| | 3 | | |
| RESERVE (1405) | | ★★★ | 1409 |
| UNUSABLE (1406) | 3 | ★★ | 1410 |
| | 2 | | |
| | 1 | ★ | 1411 |

FIG. 14B

| SORT-OUT RESULT (1412) | CYCLE (1413) | EVALUATION (1414) | |
|---|---|---|---|
| USABLE (1415) | 1 | ★★★★★ | 1418 |
| | 2 | ★★★★ | 1419 |
| | 3 | ★★★ | 1420 |
| | 4 | ★★ | 1421 |
| | 5 | | |
| | 6 | ★ | 1422 |
| | 7 | | |
| RESERVE (1416) | | 0 | 1423 |
| UNUSABLE (1417) | | −1 | 1424 |

IMAGE PROCESSING APPARATUS AND CONTROL METHOD THEREOF

BACKGROUND OF THE INVENTION

1. Field of the Invention

The present invention relates to an image processing apparatus and its control method and, more particularly, to an image selecting method attained by an application program which operates on a computer of an image processing apparatus and has a function for selecting an image or an application program having a function for evaluating an image.

2. Description of the Related Art

A digital camera has spread into our lives and cultures. In association with the progress of recent peripheral techniques of cameras and computers, the number of photographed images held by the user is extremely large.

When arranging such an extremely large number of photographed images, an operation in which such a check that the image is enlargedly displayed and inspected or the like is made and an "evaluation" about whether or not the image is a "valid" image is assigned is necessary. However, when the number of images is extremely large, much labors and a long time are required to accurately evaluate the images. The more the number of images increases, the more it is difficult to stably maintain a reference for evaluation in a range from the beginning to the end.

A general application program to create a photographic collection has a processing step of selecting an image file at an initial stage after the start of the application. However, since a long time is also required to select a target image from an extremely large number of images photographed by a digital camera, the user needs a very long time and a large amount of labors. Thus, there occurs such a situation that the number of image files which remain in a hard disk of a computer without being processed after photographing and are not used is large.

As a method of arranging and evaluating the images, for example, generally, there is an application program such as "Windows (registered trademark) Live Photo Gallery" of Microsoft Corporation; that is, an application program for sequentially executing such operations that images are enlargedly displayed one by one and an evaluation to the image is designated by a point number.

As another example, a method whereby such operations that two images are enlargedly displayed and compared with each other to decide their superiority/inferiority and leave the image having a higher evaluation and the next image is enlargedly displayed to be compared with the left image are sequentially repeated and the image having the highest evaluation is finally decided has also been proposed (refer to the Official Gazette of Japanese Patent Application Laid-Open No. 2003-018516).

However, according to any one of those methods, if the number of images to be subjected to he evaluation reaches an extremely large value such as hundreds of images, a long time is required in order to carefully check the images one by one, so that a heavy burden on the checking is applied to the user. There are many cases where comparison between the evaluation reference of the image at the initial stage and that at the last stage are compared shows a large difference, so that the proper image selection cannot be attained.

Therefore, such an effective mechanism that with respect to an extremely large number of photographed images held by the user of the digital camera, the user can still select the proper image without being aware of the heavy burden while maintaining the evaluation reference of the image is demanded.

SUMMARY OF THE INVENTION

To solve the above-described problem, according to an aspect of the invention, an image processing apparatus comprises: an obtaining unit configured to obtain a plurality of images from a storage medium; a display control unit configured to display the plurality of images obtained by the obtaining unit on a display apparatus; an operating unit configured to execute one of an operation for ranking the plurality of images and an operation for reserving the ranking; a control unit configured to control the operating unit and the display control unit in such a manner that after one of the ranking operation by the operating unit and a ranking process to execute the operation for reserving the ranking is executed to all of the plurality of images displayed on the display apparatus by the display control unit, the image to which the operation for reserving the ranking is executed is displayed by the display control unit, and the ranking process is repeated to the displayed image; and a recording unit configured to create rank information in accordance with the number of repetition times of the ranking process and contents of the operation executed to the image by the operating unit and record the rank information related with the image on the storage medium.

According to the present invention, even if the number of original images serving as a mother group of the images to be selected is large, by repetitively executing a sort-out cycle based on a repetition of a simple image comparison such as "usable", "unusable", and "reserve", all of the scheduled images can be selected while maintaining a selection reference.

Since information showing the number of the repetition times of the sort-out cycle required to select the the image can be applied as "priority" of the evaluation result, the user can complete the evaluation of all of the images which automatically selected, without being aware of the heavy burden.

Further features of the present invention will become apparent from the following description of exemplary embodiments with reference to the attached drawings.

BRIEF DESCRIPTION OF THE DRAWINGS

FIG. 4 is a flowchart for describing a flow of processes of each sort-out cycle described in FIG. 3 in accordance with the present invention.

FIGS. 14A and 14B are schematic diagrams for describing a concept of association between an image sort-out result and an evaluation in the second embodiment of the present invention.

DESCRIPTION OF THE EMBODIMENTS

Exemplary embodiments of the present invention will now be described in detail in accordance with the accompanying drawings.

First Embodiment

Outline of Whole System

Figure 1:
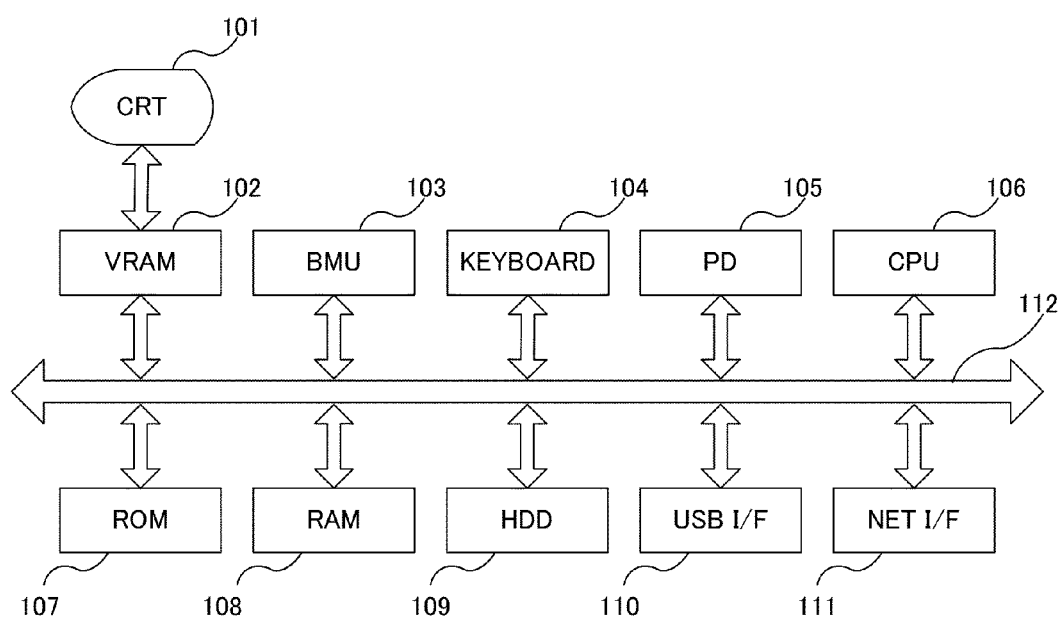
FIG. 1 is a diagram illustrating a hardware construction of a computer in which an application program having a function of an image selecting method of the present invention operates.

FIG. 1 is a diagram illustrating a hardware construction of a computer in which an application program having a function of an image selecting method of the invention operates.

In FIG. 1, a display apparatus 101 is constructed by a CRT (Cathode Ray Tube) or the like. For example, a text, graphics, and an image which are being edited, other edition information, an icon, a message, a menu, and other user interface information are displayed on a display screen of the display apparatus 101. Although the embodiment will be described with respect to a case of using the CRT as a display apparatus, the display apparatus is not limited to the CRT but may be an LCD (Liquid Crystal Display), an EL (Electro Luminescent) display, or the like.

An image to be displayed on the display screen of the CRT 101 is drawn in a Video RAM (VRAM) 102. The image created in the VRAM 102 is transferred to the CRT 101 in accordance with a predetermined rule, so that the image is displayed on the CRT 101.

A bit move unit (MBU) 103 controls, for example, a data transfer between memories (for example, the VRAM 102 and another memory) and a data transfer between the memory and each I/O device (for example, a network interface 111).

A keyboard 104 has various kinds of keys for inputting a text or the like.

A pointing device 105 is used to designate, for example, the icon, menu, and other objects displayed on the display screen of the CRT 101.

On the basis of a control program stored in a Read Only Memory (ROM) 107, a hard disk 109, or the like, a Central Processing Unit (CPU) 106 controls each device connected through a bus 112. That is, the CPU 106 executes functions of a display control unit of the display apparatus, an operating unit for entering an instruction or the like, an information recording unit for recording information onto a recording medium, and the like.

Various kinds of control programs and data are held in the ROM 107.

A Random Access Memory (RAM) 108 has a work area of the CPU 106, a temporary save area of data at the time of an error process, a load area of the control programs, and the like.

The hard disk drive (HDD) 109 can store each control program which is executed in a client computer and contents files such as image file, text file, and the like. For example, an operating system (OS), a server program, an application program, a DB management program, a table for managing various kinds of information, and the like have been stored in the hard disk 109. The hard disk drive 109 can be also substituted by a Solid State Drive (SSD) constructed by a flash memory which has been developed in recent years or a hybrid drive using both of the hard disk and the flash memory.

A Universal Serial Bus (USB) interface 110 is connected to an external device such as USB memory, Compact Disc (CD) drive, Digital Versatile Disc (DVD) drive, or the like, thereby enabling a computer to be expanded.

The network interface 111 can communicate with another information processing apparatus, a printer, or the like in a wired or wireless manner.

The control program can be provided to the CPU 106 from the ROM 107, the hard disk, or a flexible disk or from another information processing apparatus or the like through the network interface 111.

Outline of Processes of Application having Function for Selecting Image

Figure 2:
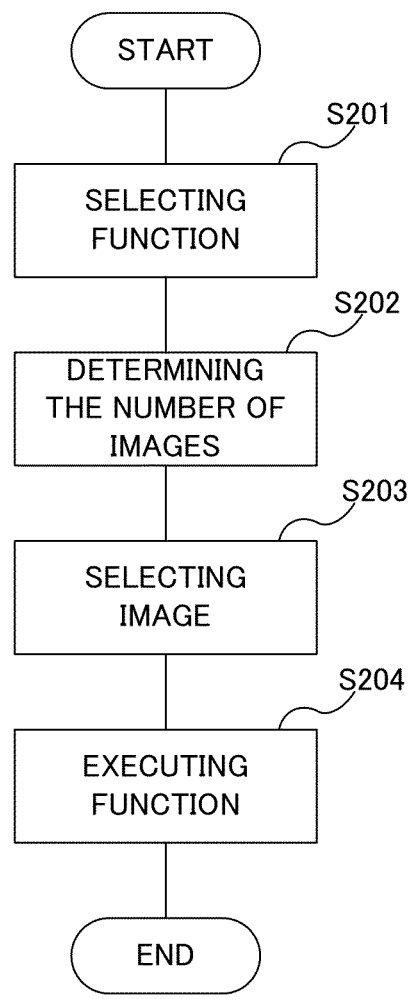
FIG. 2 is a flowchart conceptually illustrating a flow of processes by an image processing application program having the function of the image selecting method of the present invention.

FIG. 2 is a flowchart conceptually illustrating a flow of processes by an image processing application program having the function of the image selecting method of the present invention. The function of the image processing application which will be described here covers the whole application program for executing some processes by using an image and is thus not limited to particularly a predetermined function, for example, such as: a print process for printing the image to a local printer or a network printer; an editing process such as red-eye correction, color correction, RAW development, or the like of the image; a creation of a product matter such as photographic collection, film collage, or the like in which the image is used as a raw material; and the like.

In FIG. 2, first, the function to be executed by the application is decided in step S201. Specifically speaking, selection items such as printing, up-loading, editing process, and the like are considered.

Subsequently, the number of images to be used is decided in step S202. The number of "usable" images which is determined by the scheduled number of images in the case of printing, the number of pages in the case of creating a photographic collection, or the like is decided in this step. However, step S202 is not always necessary and the subsequent processes can be also continued without limiting the number of images.

Subsequently, the image to be used is selected in step S203. This step will be described in detail hereinafter.

Finally, a process using the image is executed in step S204. Specifically speaking, such a process may include the print or the editing process for creating the photographic collection can be mentioned.

Concept of Image Sort-Out Process

Figure 3:
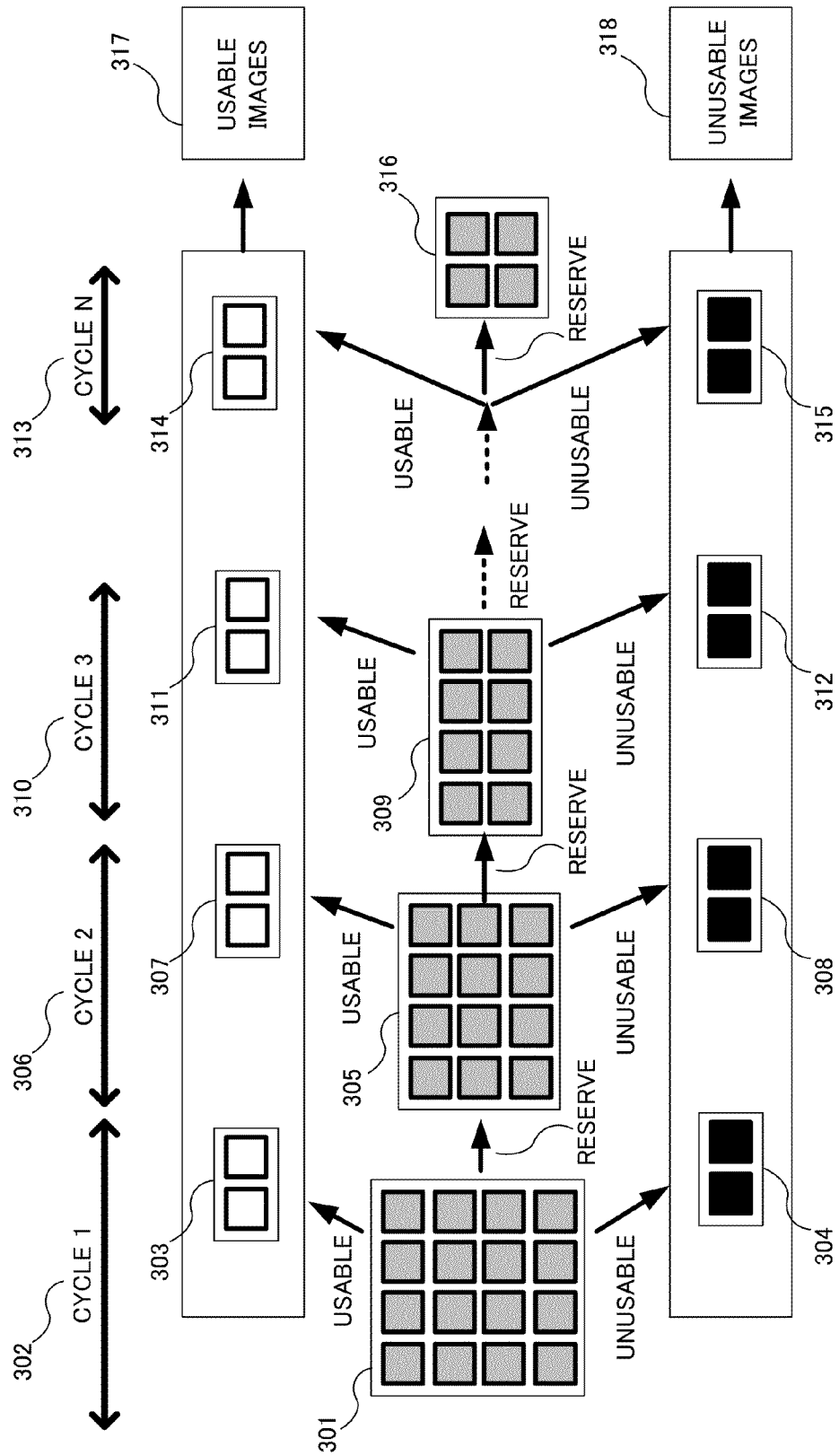
FIG. 3 is a conceptual diagram for schematically describing the method of the image selecting process of the present invention.

FIG. 3 is a conceptual diagram for schematically describing the method of the image selecting process of the present invention. The image selecting process corresponds to step S203 in FIG. 2.

In FIG. 3, a mother group 301 of images to be selected is illustrated. The mother group 301 can be also designated as a folder unit held in the HDD 109 of the computer. A memory card of a digital camera connected to the computer can be also used as it is through the USB interface 110.

First, a sort-out operation of a first cycle 302 is executed to all image files included in the first image group 301. By the sort-out operation of the first cycle 302, the user sequentially executes three kinds of judgment (ranking process) of "usable" (positive evaluation), "unusable" (negative evaluation), and "reserve" to each image in the first image group 301. By this method, all images are classified into an image group 303 which has been decided as "usable", an image group 304 which has been decided as "unusable", and an image group 305 which has been decided as "reserve".

When the first cycle 302 is finished, a second cycle 306 in which the images 305 decided as "reserve" in the first cycle are set into the mother group is started. That is, the sort-out operation (ranking operation) is repeated to the image group 305 which has been decided as "reserve".

In the second cycle 306, by the sort-out operation similar to that of the first cycle 302, all of the images are classified into an image group 307 which has been decided as "usable", an image group 308 which has been decided as "unusable", and an image group 309 which has been decided as "reserve".

Further, the sort-out operation of a third cycle 310 in which the "reserve" image group 309 obtained as a second cycle 306 is set into a mother group 504 is started and the images are classified into "usable" images 311, "unusable" images 312, and "reserve" images.

The sort-out operation by the cycles as mentioned above is repeated until a last cycle 313. Also in the last cycle 313, the images are classified into "usable" images 314, "unusable" images 315, and "reserve" images 316, so that images 317 which have been decided as "usable" images in each cycle and images 318 which have been decided as "unusable" images can be obtained.

The sort-out of the images is not limited to the three kinds of judgment of "usable", "unusable", and "reserve" mentioned above. For example, the image sort-out can be also realized by the two kinds of judgment of "usable" and "reserve" or by the two kinds of judgment of "unusable" and "reserve".

The expression of the three kinds of judgment mentioned above, for example, the expression which is displayed on the display panel is not limited to "usable", "unusable", and "reserve" but may be a combination of another expression. Particularly, in the case of the two kinds of judgment, for example, a combination of expression such as ("OK" and "NG"), ("○" and "×"), or the like may be used. Those combinations are modifications of expression and do not mean a difference of the construction of the sort-out process of the invention.

Example of Operation of Image Sort-Out Process

Processes of an image selecting cycle of the present invention will be described hereinbelow with reference to flowcharts and by an example of an operation panel for providing each processing function.

Example of Operation for Starting Image Sort-Out Process

FIG. 4 is a flowchart for describing a flow of processes of each sort-out cycle described in FIG. 3.

Figure 5A:
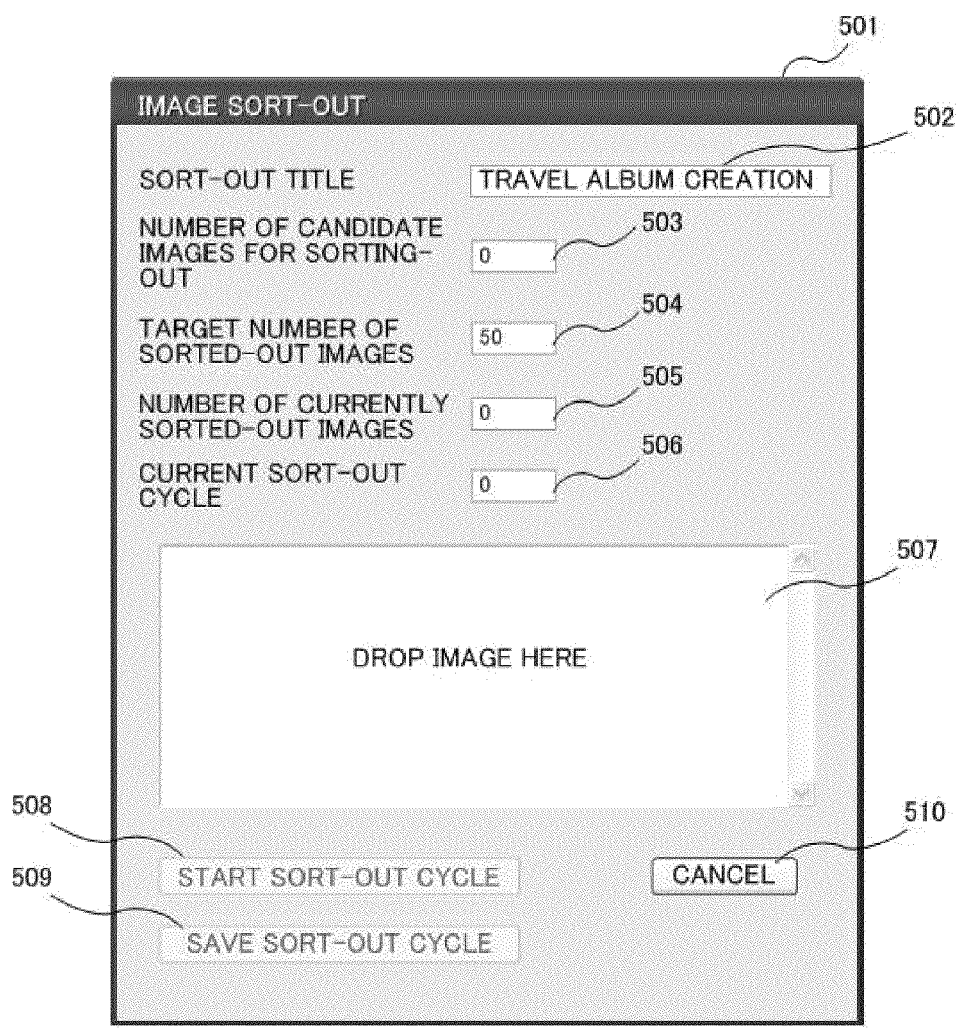
FIGS. 5A and 5B are schematic diagrams each illustrating an example of an operation panel for designating a mother group of image files and starting the sort-out cycle in the invention.
Figure 5B:
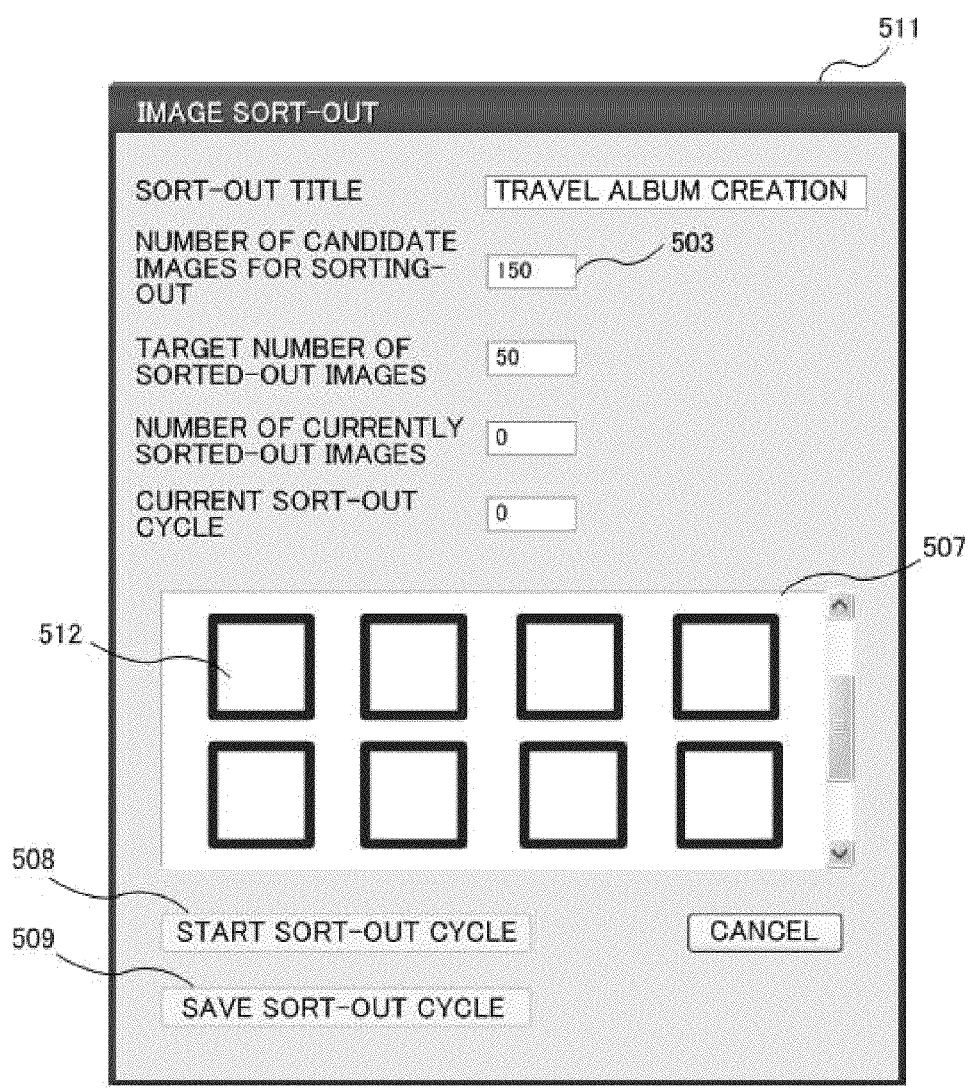

In FIG. 4, a sort-out cycle is started in step S401. At this time, first, a function (obtainment of images) for designating a mother group of image files serving as a sort-out target is executed. FIGS. 5A and 5B are schematic diagrams each illustrating an example of the operation panel for designating the mother group of the image files and starting the sort-out cycle.

In FIG. 5A, a window 501 of the operation panel is displayed. A character string input area 502 of a sort-out title, a display area 503 of the number of images serving as a mother group to be sorted out, and a display (setting) area 504 of the target number of sorted-out images are provided on this window. In addition to those areas, a display area 505 of the number of currently sorted-out images and a display area 506 of the number of the current sort-out cycle (the number of repetition times) are provided.

As illustrated in a panel 511 of FIG. 5B, a numerical value corresponding to the number of images designated in an area 507, which will be described hereinafter, is displayed in the display area 503 of the number of candidate images for sorting-out.

The area 507 for displaying thumbnails of the images serving as a mother group to be sorted-out and designating the images serving as a mother group to be sorted-out by an operation such as drag-and-drop by the pointing device 105 is also provided on the operation start window 501. As illustrated in the panel 511 of FIG. 5B, when the image file is dropped into the area 507, a thumbnail 512 of the image file is displayed in the area 507.

A button 508 to instruct a start of the sort-out cycle, a button 509 to save a state of the sort-out cycle, and a cancel button 510 to stop the sort-out process are also provided on the operation panel 501. The start button 508 and the save button 509 are controlled so that they are validated when the image exists in the area 507.

When an image file group serving as a mother group to be sorted out is designated in the drop area 507 and the start button 508 is pressed, the sort-out cycle is started.

Example of Sort-Out Operation of Image Sort-Out Process

When the sort-out cycle is started in step S401, target images for sort-out are enlargedly displayed and an operation panel adapted to receive a sort-out judgment is displayed in step S402.

Figure 6A:
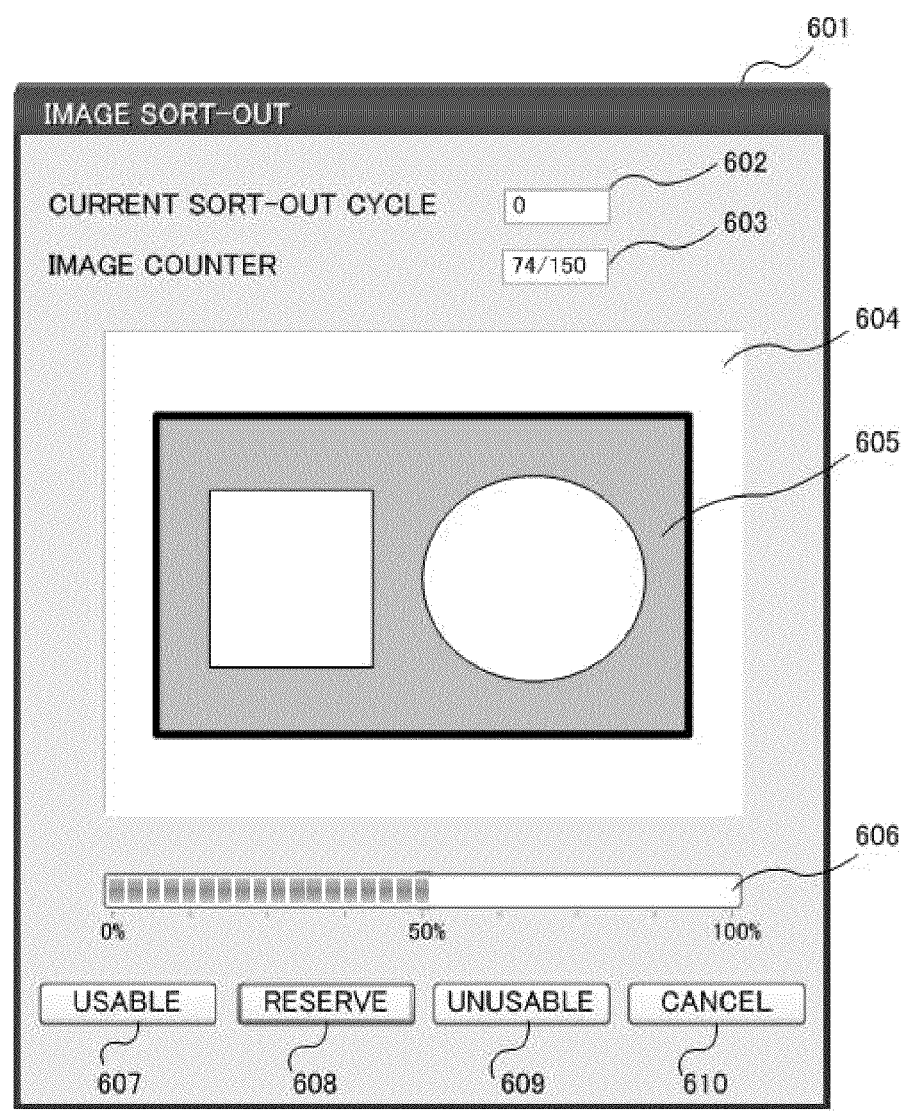
FIGS. 6A and 6B are schematic diagrams each illustrating an example of an operation panel which is displayed when executing the sort-out cycle of the present invention.

FIG. 6A is a schematic diagram illustrating an example of an operation panel for designating a sort-out judgment in step S402. In FIG. 6A, a display area 602 of the number of the current sort-out cycle, an image counter display area 603 for displaying the number of the current image, and a display area 604 for enlargedly displaying the target image for sort-out are provided in an operation panel 601.

Further, an image 605 which is enlargedly displayed and an indicator 606 for showing a degree of sort-out process which has been executed to the target number of sorted-out images are also displayed. A button 607 for instructing "usable", a button 608 for instructing "reserve", a button 609 for instructing "unusable", and a cancel button 610 for instructing a stop of the sort-out process are also arranged on the operation panel 601. Those buttons are operated to the image 605 displayed in the image display area 604.

Besides them, a display area for displaying the number of images instructed as "usable", "unusable", or "reserve" and an area for displaying a time required for the sort-out operation can be also arranged on the operation panel 601.

When the "usable" button 607 is selected in step S403, the target image is selected as a "usable" image in step S404 and the image to be subsequently sorted out is displayed in the display area 604.

When the "unusable" button 609 is selected in step S405, the target image is selected as an "unusable" image in step S406.

When the "reserve" button 608 is selected, the target image is selected as a "reserve" image in step S407.

When one of the sort-out type to the image is designated by the selection of the buttons 607, 608, and 609, whether or not the next candidate image remains is confirmed in step S408. Thus, if the remaining image exists, such an image is handled as an image to be subsequently sorted out in step S409. The processing routine is returned to step S402 and the next image is displayed in the image display area 604.

Example of Completing Operation of Image Sort-Out Process

If the next candidate image does not exist in step S409, an operation panel showing completion of one cycle for sorting-out is displayed in step S410.

Figure 6B:
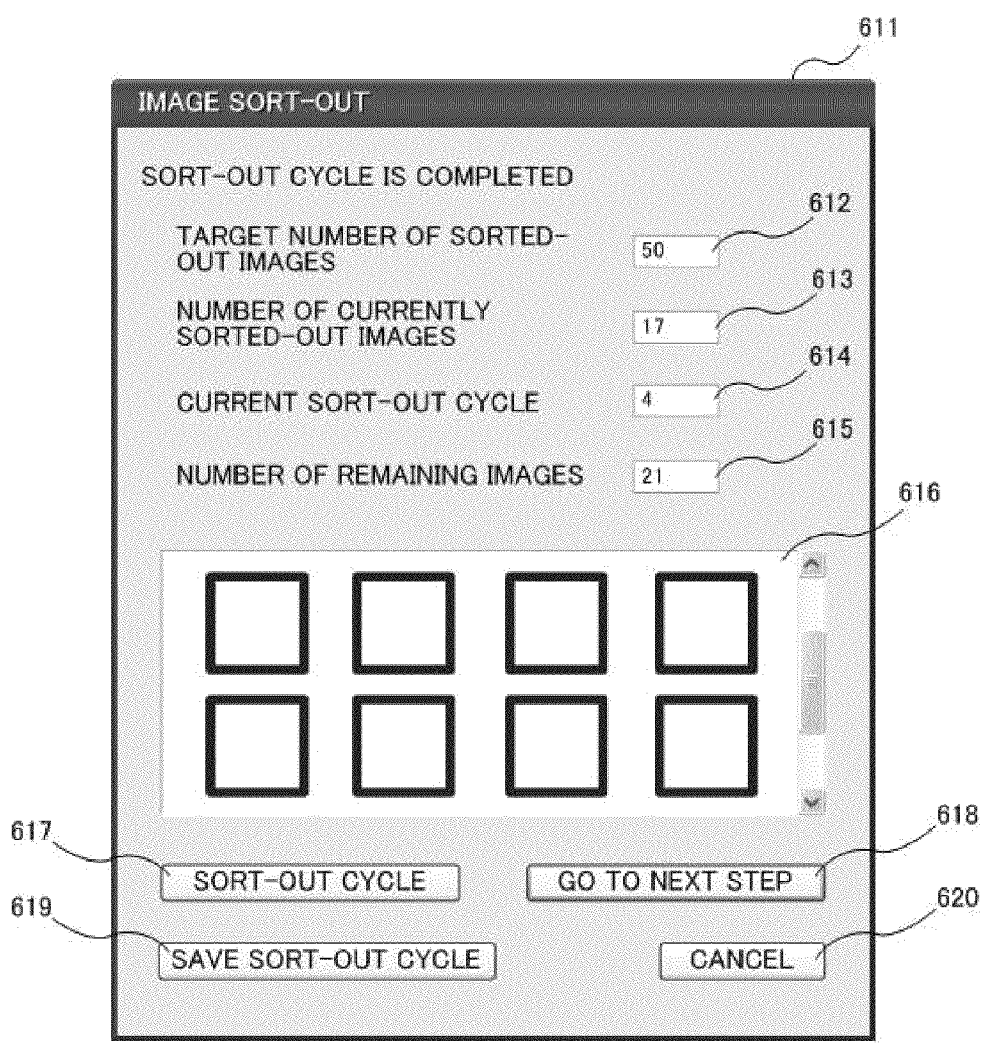

FIG. 6B is a schematic diagram illustrating an example of an operation panel which is displayed each time the sort-out cycle is completed.

In FIG. 6B, a display area 612 of the target number of sorted-out images, a display area 613 of the number of images determined as "usable" in the sort-out in the cycles until now, and a display area 614 of the number of the current sort-out cycle are provided in an operation panel 611. Further, a display area 615 of the number of images left as "reserve" images until the previous sort-out cycle and a display area 616 of a list of thumbnails of the remaining images are also provided. A continuation button 617 for instructing that the next sort-out cycle is started while setting the images displayed in the thumbnail display area 616 into a mother group and a proceed button 618 for instructing that the sort-out operation of the images is completed and the processing routine advances to the next step of the application are also provided on the operation panel 611. In association with those buttons, a button 619 for instructing that a sort-out state of the image is temporarily saved and a cancel button 620 for instructing that the sort-out operation is stopped are also provided.

Besides them, a display area of the number of images selected as "usable" images every cycle and a thumbnail list of the images selected every cycle can be also provided on the operation panel 611. A display area of the number of images processed as "unusable" images, a thumbnail list of those images, an area for displaying a total time required for the sort-out operation, and the like can be also provided.

Control of Continuation and Completion of Image Sort-Out Process

Figure 7:
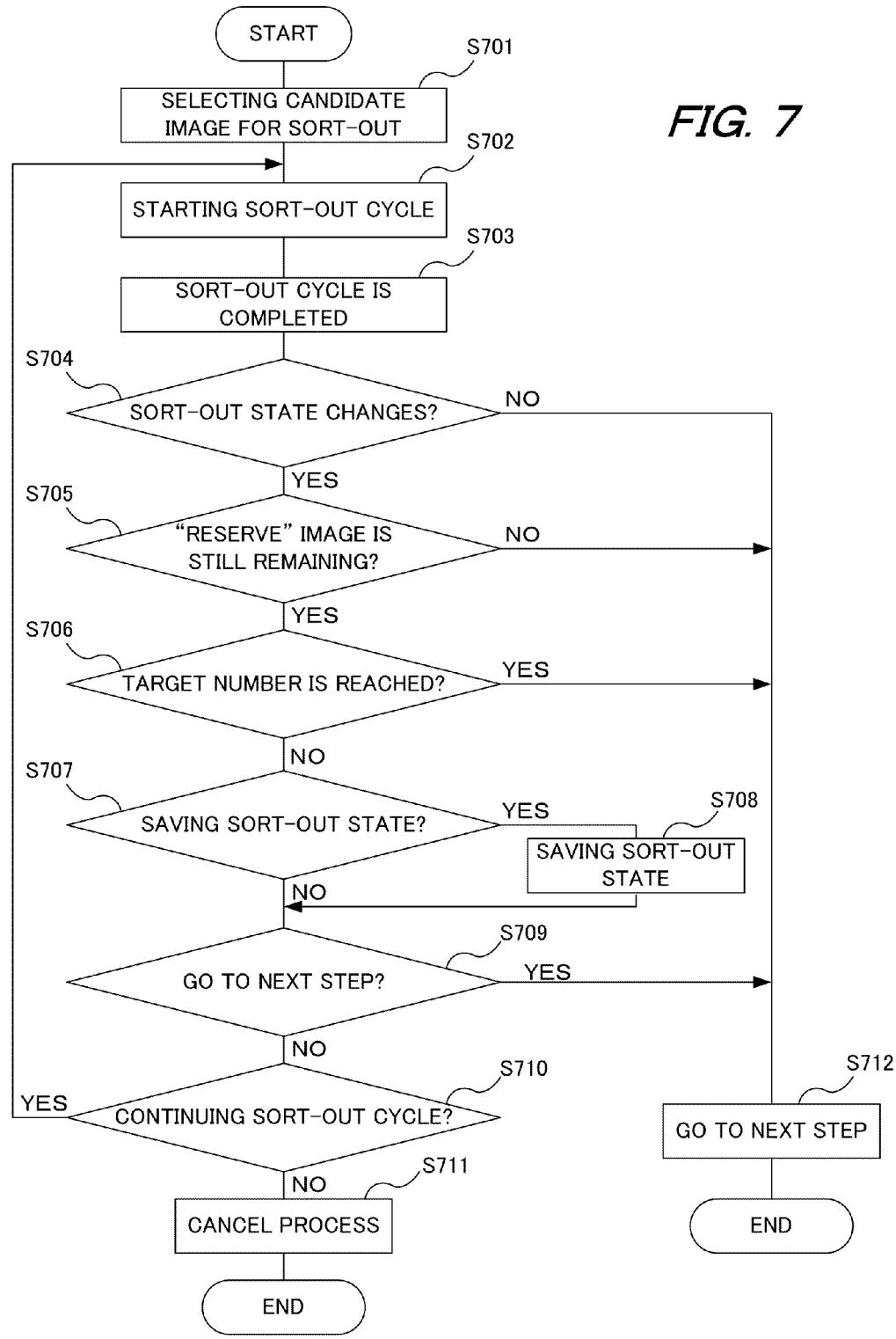
FIG. 7 is a flowchart for describing a flow of a process of a continuation judgment of the sort-out cycle of the present invention.

Subsequently, a flow for processes for controlling a continuation and a completion of the sort-out cycle will be described. FIG. 7 is a flowchart for describing a flow of a process of a continuation judgment of the sort-out cycle.

In FIG. 7, when a mother group of candidate images for sort-out is designated by the operation panels of FIGS. 5A and 5B mentioned above and the sort-out process is started, one of the sort-out cycles of the sort-out process is executed by the foregoing operation panel of FIG. 6A. When one sort-out cycle is completed in step S703, whether step S203 for selecting the images is completed to advance the processing routine to step S204 for executing the function or step S203 is repeated in order to continue the image selection is discriminated and controlled.

First, in step S704, whether or not there is a change in sort-out state in the selecting cycle which was performed at last, that is, whether or not the image which was newly designated as a "usable" image or an "unusable" image has been added in the last selecting cycle is confirmed. If the image whose selecting state was changed does not exist, it is determined that it is meaningless that the selecting cycle is repeated more than that. Thus, step S712 follows and the processing routine advances to next step (that is, the process of step S204).

If there is a change in selecting state through the last selecting cycle, whether or not the image which was decided as a "reserve" image remains is confirmed in step S705. If the "reserve" image does not remain, the processing routine cannot advance to the next cycle. Therefore, step S712 follows and the processing routine advances to step S204 at the next stage.

If the "reserve" image remains, whether or not the number of selected images has reached the target number of selected images is confirmed in step S706. If it reached the target number, step S712 follows and the processing routine advances to step S204 at the next stage.

If it does not reach the target number in step S706, the operation panel of FIG. 6B mentioned above is displayed and an instruction from the user is received with respect to the continuation of the sort-out cycle.

When the save button 619 is selected, it is determined in step S707 that the saving of the sort-out cycle has been instructed. A save process of the sort-out state is executed in step S708. A saving method will be described in detail hereinafter.

When the proceed button 618 is designated, it is determined in step S709 that the processing routine advances to next step S204. The processing routine advances to step S712.

When the continuation button 617 is selected, it is determined in step S710 that the sort-out cycle is resumed. The processing routine is returned to step S702 and the next sort-out cycle is executed.

When the cancel button 620 is selected, a cancel process is executed in step S711. In this manner, all processes are finished.

As mentioned above, in the invention, the judgment about the continuation and completion of the sort-out cycle can be instructed on the basis of the automatic judgment according to the change in sort-out state and the manual judgment by the user.

Example of Operation of Plural Image Batch Sort-Out Process

Although the example of the operation panel for designating the sort-out types such as "usable" "unusable" and "reserve" to each image file has been shown in FIG. 6A mentioned above, a plurality of image files can be also collectively sorted-out and designated.

Figure 8A:
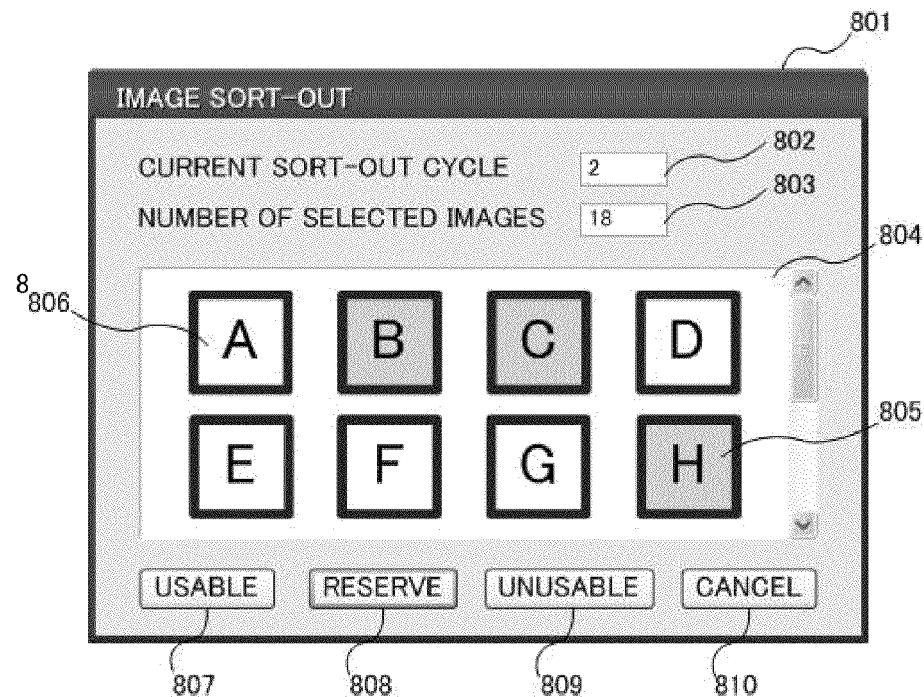
FIGS. 8A and 8B are schematic diagrams of operation panels adapted to instruct a sort-out to a plurality of files in accordance with the present invention.
Figure 8B:
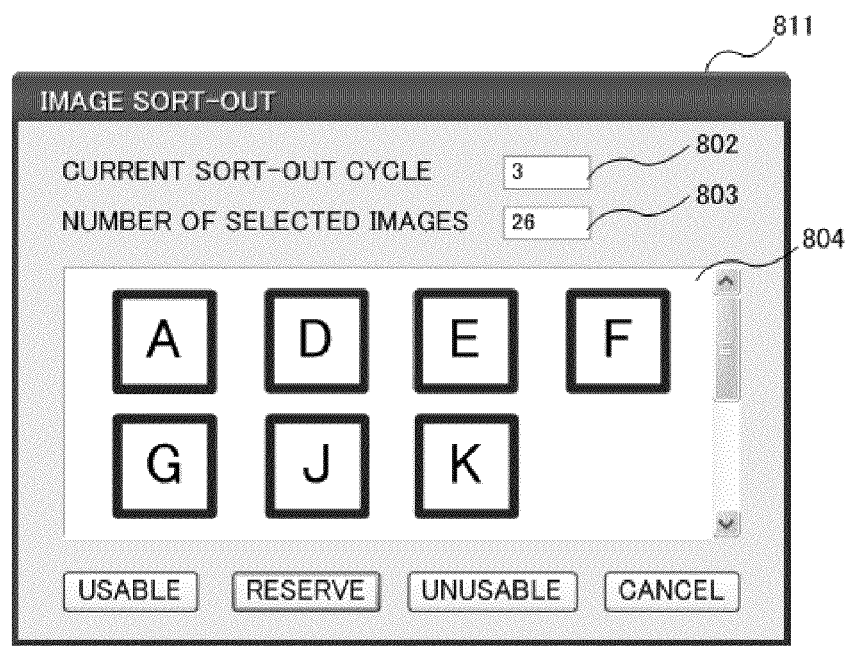

FIGS. 8A and 8B are schematic diagrams each illustrating an operation panel adapted to instruct a sort-out to a plurality of files.

In FIGS. 8A and 8B, a display area 802 of the number of the current sort-out cycle, a display area 803 of the number of images selected as "usable" images, and a thumbnail display area 804 for displaying thumbnails of the target image files for sort-out are provided in an operation panel 801. Further, in a manner similar to FIGS. 6A and 6B, a button 807 for designating "usable" to specific images, a button 809 for designating "unusable", a button 808 for designating "reserve", and a cancel button 810 are arranged. Only an arbitrary number of plural thumbnails which are displayed in the thumbnail display area 804 can be selected. Each of the buttons 807, 808, and 809 can be designated in a lump to thumbnails 805 selected in the area 804.

When the designation by each of the buttons 807, 808, and 809 is performed, a sort-out of each of the thumbnails 805 in the selecting state is designated. Thus, only image thumbnails 806 which are not in the selecting state in the area 804 in FIG. 8A are left and displayed in the area 804 of an operation panel 811 as illustrated in FIG. 8B.

At the stage where there are no remaining images in the area 804, it is determined that the processes of the relevant cycle have been finished, and the processing routine advances to the process for judgment about the continuation and completion of the sort-out cycle mentioned above.

Saving Method of Sort-Out State

Subsequently, the saving method of the sort-out state in the embodiment will be described with reference to FIG. 9.

Figure 9:
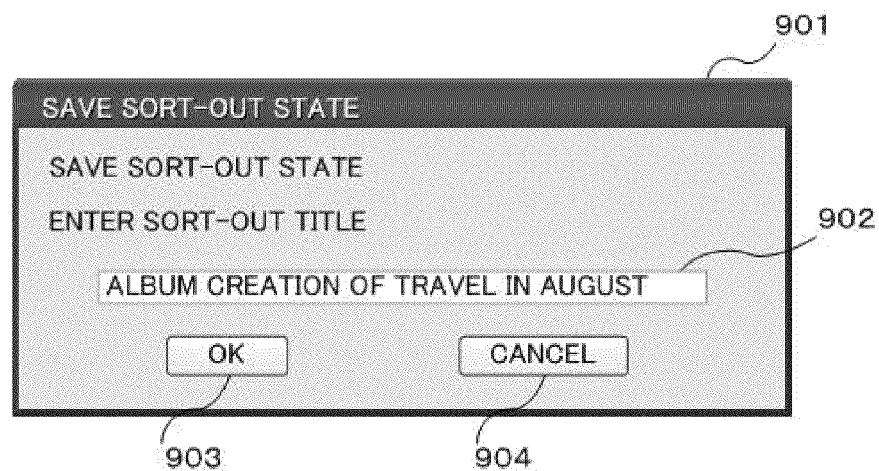
FIG. 9 is a schematic diagram of an operation panel adapted to instruct a save process of a sort-out state in accordance with the present invention.

FIG. 9 is a schematic diagram of an operation panel adapted to instruct the save process of the sort-out state.

In FIG. 9, a window 901 is an operation panel for saving the sort-out state. When the button 619 in FIG. 6B is now selected and the start of the save process of the sort-out state is designated, the saving of the sort-out state is started in step S708 and the sort-out state saving panel 901 is displayed.

An input column 902 of a sort-out title for entering a character string of the sort-out title serving as a name of the sort-out state to be saved, an OK button 903 for executing the sort-out process, and a cancel button 904 for stopping the sort-out process are arranged in the sort-out state saving panel 901.

The sort-out state can be uniquely discriminated by the sort-out title which is input to the sort-out title input column 902. Therefore, if the sort-out title which is newly input is overlapped with a title of another sort-out state which has already been saved, the sort-out state is overwritten.

By selecting the execution button 903 of the sort-out process, the sort-out state of the name which was input to the sort-out title input column 902 is saved and the sort-out state saving panel 901 is closed.

When the cancel button 904 of the sort-out process is selected, the saving of the sort-out state is stopped and the display screen is returned to a state before the sort-out state saving panel 901 is displayed.

Read-In Method of Sort-Out State

Subsequently, a resuming method of the sort-out state saved in the embodiment will be described with reference to FIG. 10.

Figure 10:
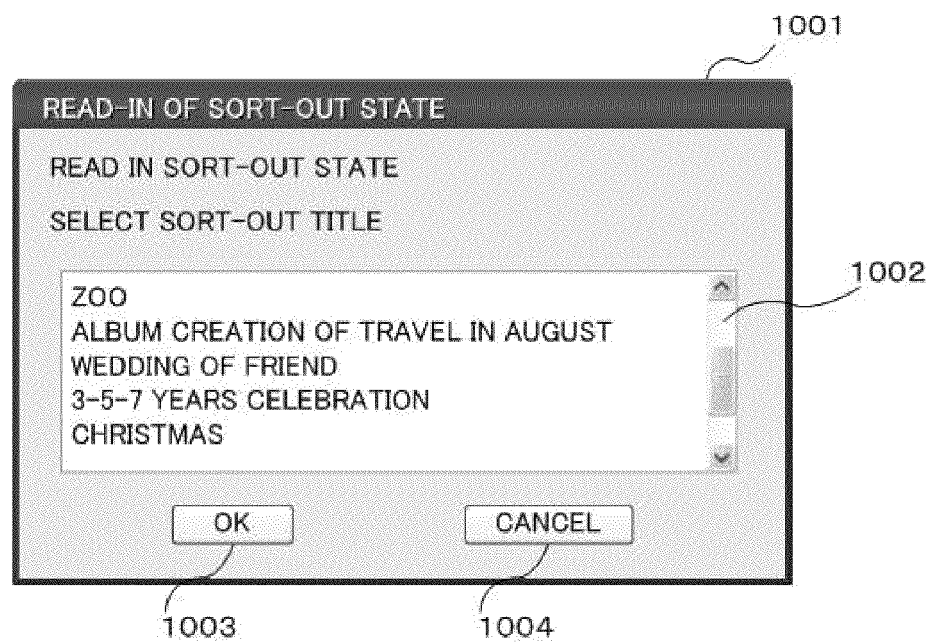
FIG. 10 is a schematic diagram of an operation panel adapted to instruct a resume process of the sort-out state in accordance with the present invention.

FIG. 10 is a schematic diagram of an operation panel adapted to instruct a resume process of the sort-out state.

In FIG. 10, an operation panel window 1001 is a read-in operation panel of the sort-out state. A sort-out title selection list box 1002 for selecting the sort-out title of the sort-out state to be read in, an OK button 1003 for executing the read-in of the sort-out process, and a cancel button 1004 for stopping the sort-out process are arranged on the panel 1001.

In the sort-out title selection list box 1002, the sort-out titles saved in a computer in which the application having the present function is operating are displayed as a list. One item among the sort-out titles can be selected.

By selecting the read-in execution button 1003 of the sort-out process, the sort-out state of the name input to the sort-out title selection list box 1002 is read in and the sort-out state read-in panel 1001 is closed.

When the read-in cancel button 1004 of the sort-out process is selected, the read-in of the sort-out state is stopped and the display screen is returned to a state before the sort-out state read-in panel 1001 is displayed.

Saving Format of Sort-Out State

Subsequently, a data structure of the sort-out state (rank information) to be saved in the embodiment will be described with reference to schematic diagrams of FIGS. 11A and 11B.

Figure 11A:
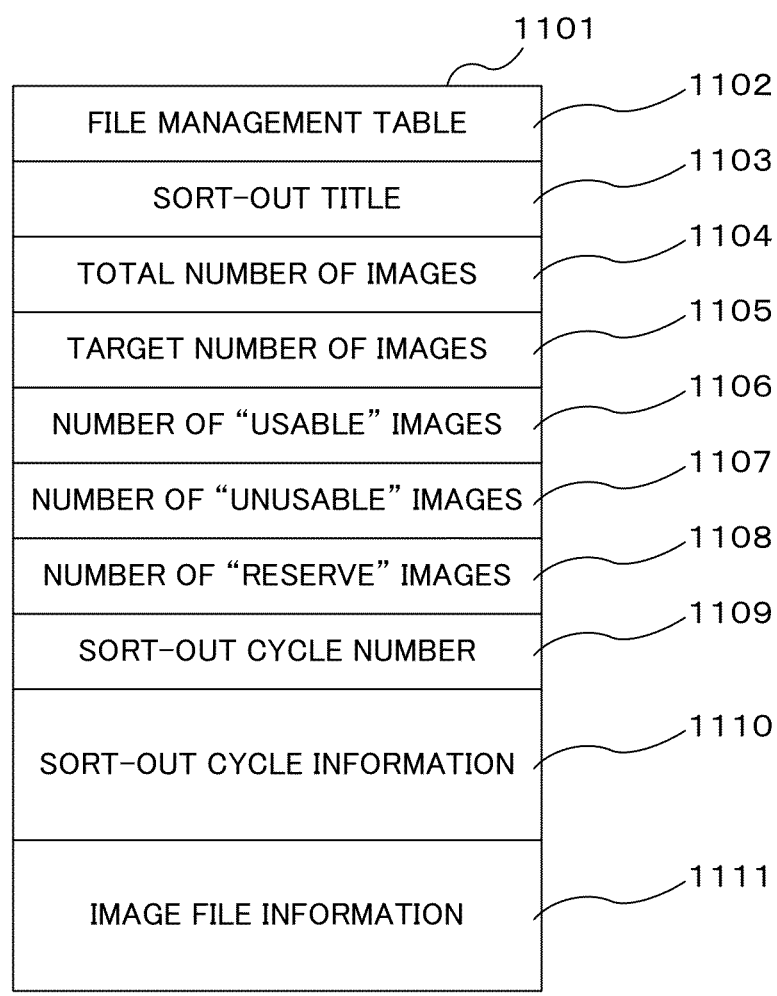
FIGS. 11A and 11B are schematic diagrams each illustrating an example of a data construction of a sort-out state management file which is managed as a sort-out state on a file in accordance with the present invention.
Figure 11B:
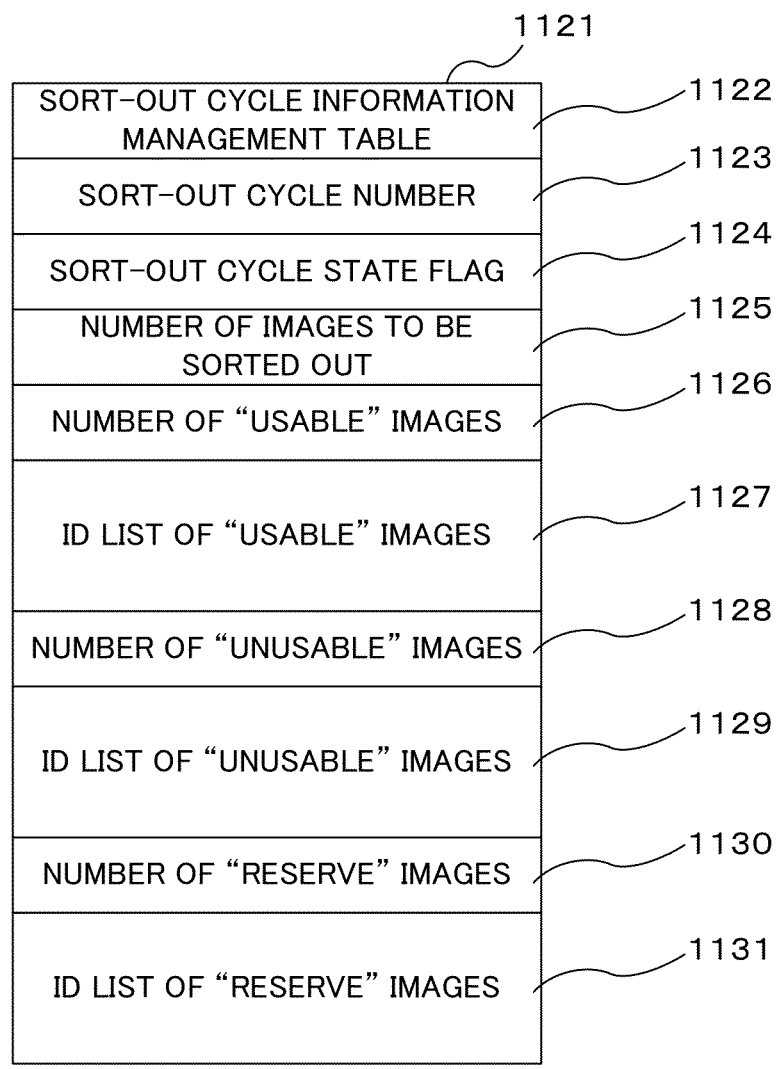

FIGS. 11A and 11B are schematic diagrams each illustrating an example of the data construction of a sort-out state management file which is managed as a sort-out state on a file.

In FIG. 11A, a main body 1101 of the sort-out state management file is illustrated.

Information such as size of the sort-out state file, pointer to each constructing element, creating time/date, final saving time/date, and the like which are necessary when constructing a general file has been recorded in a file management table 1102.

A character string which was input to the sort-out title input column 902 in FIG. 9 is registered into sort-out title names 1103. A list of the sort-out titles which are displayed in the sort-out title selection list box 1002 in FIG. 10 is created by reading in the sort-out title names 1103 recorded in all of the sort-out state management files managed on the computer.

The total number of images at a point of time when the sort-out process is started is recorded in an area of the total number of images 1104. As for contents of the total number of images 1104, the contents which are displayed in the total image number display area 503 in FIGS. 5A and 5B are handled.

The target number of images to be finally selected by the sort-out process is recorded in an area of the target number of images 1105. As for contents of the target number of images 1105, the contents which are displayed in the display area 504 of the target number of sorted-out images in FIGS. 5A and 5B are handled.

The total number of images which were handled as "usable" images through the sort-out cycles until the images are saved is recorded in an area of the number of "usable" images 1106. As for contents of the number of "usable" images 1106, the contents which are displayed in the display area 505 of the number of currently sorted-out images in FIGS. 5A and 5B are handled.

The total number of images which were handled as "unusable" images through the sort-out cycles until the images are saved is recorded in an area of the number of "unusable" images 1107.

The total number of images which were handled as "reserve" images at a point of time when the sort-out state has been saved is recorded in an area of the number of "reserve" images 1108.

A sort-out cycle number at a point of time when the sort-out state has been saved is recorded in an area of the sort-out cycle number 1109.

A result and an elapse regarding each sort-out cycle are recorded in a format, which will be described hereinafter, in an area of sort-out cycle information 1110.

Paths and present situations regarding all images handled in the sort-out of the images in the present invention are recorded in an area of image file information 1111.

FIG. 11B is a schematic diagram for describing a data format which is recorded in the image file information 1110 in the sort-out state management file 1101.

In FIG. 11B, sort-out cycle information data 1121 of each sort-out cycle unit is illustrated. The sort-out cycle information data 1121 of the number corresponding to the sort-out cycle number 1109 is recorded in the image file information 1110.

A pointer to each constructing element and information such as start time/date and the like regarding the relevant sort-out cycle are recorded in a sort-out cycle information management table 1122.

The number of the sort-out cycle to which the relevant sort-out cycle information data belongs is recorded in an area of a sort-out cycle number 1123.

A state showing whether the relevant sort-out cycle has been completed or the sort-out operation is being executed is recorded in an area of a sort-out cycle state flag 1124.

The number of target images for sort-out at a point of time when the relevant sort-out cycle has been started is recorded in an area of the number of images to be sorted out 1125.

The number of images designated as "usable" images at the relevant sort-out cycle at a point of time when the sort-out process has been completed or stopped is recorded in an area of the number of "usable" images 1126.

A list of the IDs of the images designated as "usable" images at the relevant sort-out cycle at a point of time when the sort-out process has been completed or stopped is recorded in an area of "usable" image ID list 1127. A relation between the image ID and the actual image file will be described hereinafter.

The number of images designated as "unusable" images at the relevant sort-out cycle at a point of time when the sort-out process has been completed or stopped is recorded in an area of the number of "unusable" images 1128.

A list of the IDs of the images designated as "unusable" images at the relevant sort-out cycle at a point of time when the sort-out process has been completed or stopped is recorded in an area of "unusable" image ID list 1129.

The number of images designated as "reserve" images at the relevant sort-out cycle at a point of time when the sort-out process has been completed or stopped is recorded in an area of the number of "reserve" images 1130.

A list of the IDs of the images designated as "reserve" images at the relevant sort-out cycle at a point of time when the sort-out process has been completed or stopped is recorded in an area of "reserve" image ID list 1131.

Figure 12A:
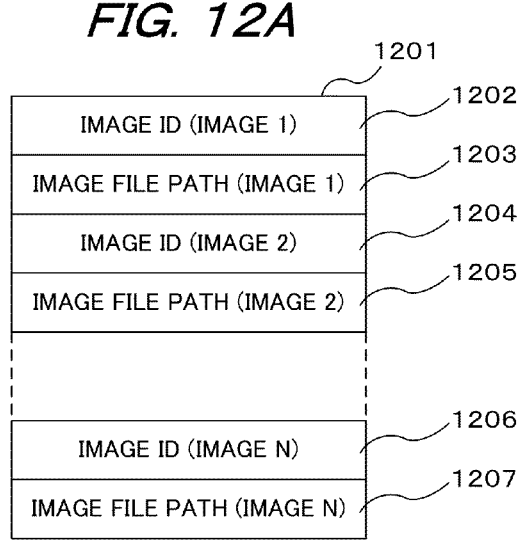
FIGS. 12A, 12B, and 12C are schematic diagrams each for describing a data format of image file information in the sort-out state management file described in FIGS. 11A and 11B in accordance with the present invention.
Figure 12B:
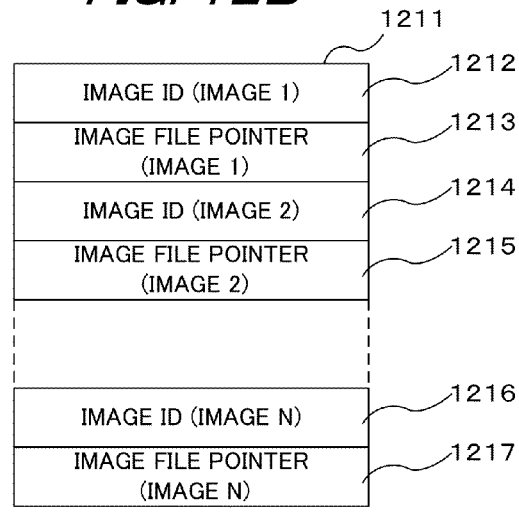
Figure 12C:
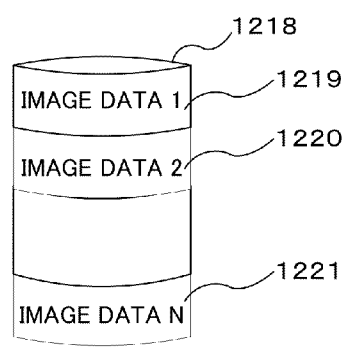

FIGS. 12A, 12B, and 12C are schematic diagrams each for describing a data format which is recorded in the image file information 1111 in the sort-out state management file 1101.

FIG. 12A is an example of a method of recording, particularly, link information of the image file.

In FIG. 12A, image file information 1201 is similar to the image file information 1111. Associations between the IDs of the images which are used for the sort-out process and the image file paths are recorded as a list as many as the total number of images 1104.

As an ID 1202 of the first image file 1, an ID to which a unique value has been assigned in the image of the sort-out process to the corresponding image file 1 is recorded.

A file path 1203 indicates an existing location of the first image file 1 in the computer.

An ID 1204 of the second image file 2 and a file path 1205 of the second image file 2 are provided.

An ID 1206 of the last image file N and a file path 1207 of the image file N are provided.

As mentioned above, IDs of all of the images and the file paths are recorded as a list in the image file information 1201.

FIG. 12B is an example of a data format which is recorded in the image file information 1111 in the case of collectively holding the image files into an archive. FIG. 12C is a schematic diagram of a state of an archive file in which the image files have been collected.

In FIG. 12B, image file information 1211 is similar to the image file information 1111. Associations between the IDs of the images which are used for the sort-out process and pointers in the archive file of the image file data are recorded as a list as many as the total number of images 1104.

As an ID 1212 of the first image file 1, an ID to which a unique value has been assigned in the image of the sort-out process to the corresponding image file 1 is recorded.

A data pointer 1213 of the first image file 1 is provided. Contents of a pointer 1219 in an archive file 1218 are recorded.

An ID 1214 of the second image file 2 and a data pointer 1215 of the second image file 2 are provided.

An ID 1216 of the last image file N and a data pointer 1217 of the image file N are provided.

As mentioned above, IDs of all of the images and the data pointers are recorded as a list in the image file information 1211.

In FIG. 12C, the archive file 1218 in which all image files which are handled have been collected is provided. The data pointer 1219 of the image file 1, a data pointer 1220 of the image file 2, and a data pointer 1221 of the image file N are illustrated, respectively.

By collectively saving the target image files for sort-out into the archive file as described above, even if there is a change in saving state of the image file from the point of time when the sort-out operation of the image has been stopped, the sort-out operation can be resumed from the state at the point of time of the stop. Although one archive file exists here, the target image files can be also divisionally saved into a plurality of archive files.

Second Embodiment

Subsequently, an embodiment in which in an application having an object of arranging the images, the technique of the invention is applied as such a function that the images are sorted out and evaluations of a few levels are collectively assigned thereto will be described.

Outline of Processes of Application having Function for Arranging Images

Figure 13:
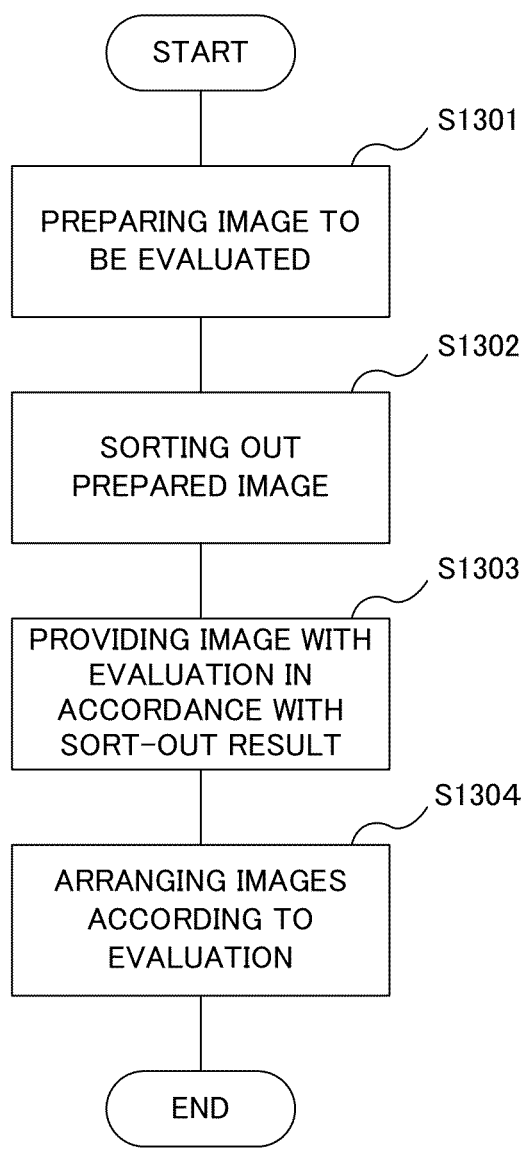
FIG. 13 is a flowchart conceptually illustrating a flow of processes by an application program having an image arranging function of the second embodiment of the present invention.

FIG. 13 is a flowchart illustrating a flow for general processes by an application program having the image arranging function in the second embodiment of the present invention.

In FIG. 13, first, an image to be handled in the application is prepared in step S1301. The image which is handled here is not limited to the image file stored in the HDD 109 of the computer. For example, the image which is handled here includes image data which is obtained from a digital image input apparatus such as digital camera, scanner, or the like through the USB interface 110. It can also include image data which is obtained from various kinds of media such as CD, DVD, memory card, and the like or obtained through the network interface 111, or the like.

Subsequently, a sort-out process of the images is executed in step S1302. This image sort-out process is a method in the invention described in the foregoing embodiment 1 and its detailed description is omitted here. In such an application that the evaluation can be collectively designated to the selected images like "Windows (registered trademark) Live Photo Gallery" of Microsoft Corporation, such a processing step becomes a process for simply setting a part of the image into the selecting state.

Subsequently, the evaluation is assigned to the image in accordance with a sort-out result in step S1303. A detailed method of associating the sort-out result with the evaluation (evaluation degree) will be described hereinafter.

Finally, in step S1304, the image is arranged in accordance with the evaluation. As an image arranging method in this step, there is a method whereby the result of the assigned evaluation is merely embedded into each image file and prepared for a retrieval, a method whereby the image files are moved and managed every evaluation, or the like. However, the method is not limited here. This step is not always necessary in the application having the image arranging function in the embodiment.

Concept of Deciding Method of Image Evaluation

FIGS. 14A and 14B are schematic diagrams for describing a concept adapted to associate the image sort-out result with the evaluation in the invention.

FIG. 14A illustrates a correspondence relation between each sort-out cycle and the evaluation in the case of setting the evaluation to all images of the "usable" images, "unusable" images, and "reserve" images in the sort-out result.

In a table (degree information) of FIG. 14A, a column 1401 indicates a sort-out result, a column 1402 indicates a sort-out cycle at which the sort-out has been performed, and a column 1403 indicates a point number of the evaluation which is assigned to each image group.

As a sort-out result 1401, there are images 1404 which have been determined respectively as "usable", a "reserve" image 1405, and an "unusable" image 1406. To each of the "usable" image 1404 and the "unusable" image 1406, an evaluation point of one of five levels 1407 to 1411 is set in accordance with the sort-out cycle in which the judgment has been made.

Since the number of levels of the sort-out cycle 1402 and the number of levels of the evaluation 1403 are not always equal, an association between each sort-out cycle and the evaluation level can be designated by the user. Its detailed method will be described hereinafter.

FIG. 14B illustrates an example of another correspondence of the association between the sort-out result and the evaluation and illustrates a correspondence relation between each sort-out cycle and the evaluation in the case of setting the evaluation only to the "usable" images in the sort-out result.

In a table of FIG. 14B, a column 1412 indicates a sort-out result, a column 1413 indicates a sort-out cycle at which the sort-out has been performed, and a column 1414 indicates a point number of the evaluation which is assigned to each image group.

To an image 1415 which has been determined as "usable" in the sort-out result 1412, an evaluation point of one of five levels 1418 to 1422 is set in accordance with the sort-out cycle in which the judgment has been made.

An image 1416 which has been determined as "reserve" in the sort-out result 1412 is handled as an image to which no evaluation point is assigned (1423). To an image 1417 which has been determined as "unusable" in the sort-out result 1412, an evaluation point of −1 is assigned (1424).

Since the number of levels of the sort-out cycle 1413 and the number of levels of the evaluation 1414 are not always equal, an association between each sort-out cycle and the evaluation level can be designated by the user in a manner similar to the case of FIG. 14A. Its detailed method will be described hereinafter.

Method of Assigning Evaluation to Sorted-Out Image

Subsequently, a method of assigning the evaluation to the sorted-out image will be described.

Figure 15:
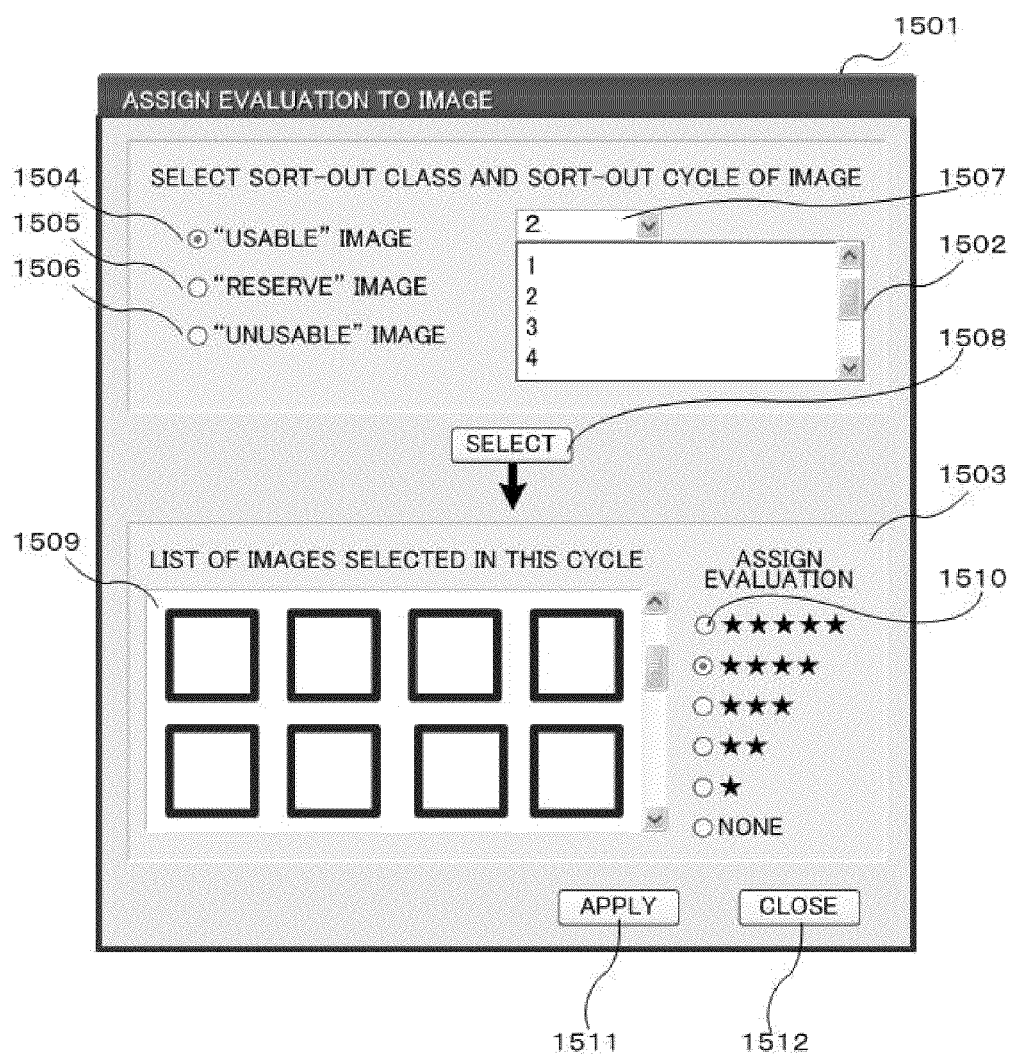
FIG. 15 is a schematic diagram of an operation panel adapted to execute a function for assigning an evaluation to a sorted-out image in the second embodiment of the present invention.

FIG. 15 is a schematic diagram of an operation panel adapted to execute a function for assigning an evaluation to a sorted-out image in the invention.

In FIG. 15, a window 1501 of an operation panel is constructed by an area 1502 having a function for preparing the image to which the evaluation is assigned and an area 1503 for designating the evaluation to the prepared image.

Radio-buttons 1504-1506 for designating respective "usable", "reserve", and "unusable" images as a sort-out result and a combo-box menu 1507 for designating the sort-out cycle are provided in the area 1502. When the user designates one of the radio-button 1504 to 1506 and the sort-out cycle 1507 and selects a select button 1508, thumbnails of all of the corresponding images are displayed in a thumbnail list area 1509 in the area 1503.

When a radio-box 1510 for designating the assignment of the evaluation is designated and an apply button 1511 is selected to the image displayed in the thumbnail list area 1509, the same evaluation is assigned to such an image.

When a close button 1512 is selected, the evaluation assigning process is stopped and the operation panel is closed.

According to the method described here, an arbitrary evaluation can be assigned to an arbitrary sort-out cycle. By setting a validation and an invalidation to the radio-box 1510 on the basis of an applying situation until now, for example, control can be made in such a manner that a high evaluation is not assigned to an image which will be selected later.

Although the invention has been described in detail above with respect to the exemplary embodiments, the invention is not limited to those specific exemplary embodiments but various modifications in a range without departing from the essence of the invention are also incorporated in the invention. A part of the foregoing embodiments may be properly combined.

The invention also incorporates a case where a program of software for realizing the functions of the embodiments mentioned above is supplied to a system or an apparatus having a computer which can execute the program directly from a recording medium or by using wired/radio communication and the program is executed. Therefore, a program code itself which is supplied or installed to the computer in order to realize the functions and processes of the invention by the computer also realizes the invention.

That is, the computer program itself for realizing the functions and processes of the invention is also incorporated in the invention. In this case, a form of the program is not limited and any of the forms such as object code, program which is executed by an interpreter, script data which is supplied to the OS, and the like can be used so long as it has the functions of the program. As a recording medium for supplying the program, for example, a hard disk, a magnetic recording medium such as a magnetic tape or the like, an optical/magnetooptic storage medium, or a non-volatile semiconductor memory may be used. As a supplying method of the program, a method whereby the computer program which forms the invention is stored into a server on the computer network and a connected client computer downloads the computer program and executes processes based on the computer program is also considered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-101896, filed Apr. 27, 2010, which is hereby incorporated by reference herein in its entirety.

What is claimed is:

1. An image processing apparatus comprising:
   an obtaining unit configured to obtain a plurality of images from a storage medium;
   a display control unit configured to display the plurality of images obtained by the obtaining unit on a display apparatus;
   an operating unit configured to execute a selecting process which is arranged to perform at least one of a selecting operation and a reserving operation to the plurality of images;

a control unit configured to control the operating unit and the display control unit in such a manner that, after the selecting operation or the reserving operation is executed to all of the plurality of images, the images to which the reserving operation is executed are displayed by the display control unit, and the selecting process is repeated to the images to which the reserving operation is executed; and a recording unit configured to create rank information to the plurality of images in accordance with the selecting process and record the created rank information related with the number of repetition times of the selecting process on the storage medium, wherein the selecting operation to be executed in each repetition of the selecting process is a same operation regardless of the number of repetition times of the selecting process, and wherein the rank information created to the image subjected to the selecting operation differs in accordance with the number of repetition times of the selecting process executed to the image.

2. An apparatus according to claim 1, wherein the selecting operation is at least one of an operation for a positive evaluation and an operation for a negative evaluation.

3. An apparatus according to claim 1, wherein when the image to which the rank information corresponding to the reserving operation is assigned is not recorded by the recording unit, the control unit finishes the repetition of the selecting process.

4. An apparatus according to claim 1, wherein when there is no image recorded by the recording unit, the control unit finishes the repetition of the selecting process.

5. An apparatus according to claim 1, wherein the control unit has:
   a designating unit configured to set a plurality images into a designating state among the images displayed by the display control unit on the display apparatus; and
   an executing unit configured to execute the operation by the operating unit in a lump to the images designated by the designating unit.

6. An apparatus according to claim 1, wherein the operating unit has a setting unit configured to set the number of images which are subjected to the ranking operation, and wherein when the number of images to which the ranking operation by the operating unit is executed reaches the number set by the setting unit, the control unit finishes the repetition of the selecting process.

7. An apparatus according to claim 1, wherein the operating unit has an instructing unit configured to resume the repetition of the selecting process, and wherein the control unit resumes the repetition of the selecting process in response to an instruction by the instructing unit in accordance with the rank information recorded by the recording unit.

8. An apparatus according to claim 1, wherein the operating unit has a stop unit configured to stop the repetition of the selecting process, wherein the control unit stops the repetition of the selecting process in accordance with an instruction by the stop unit, and wherein the recording unit records information of the stop as rank information.

9. An apparatus according to claim 1, further comprising:
   a selecting unit configured to designate the number of repetition times of the selecting process and the contents of the operation executed by the operating unit, thereby selecting the image corresponding to the designated number of repetition times and the designated operation contents; and
   a designating unit configured to manually designate an evaluation degree as rank information to the image selected by the selecting unit.

10. An apparatus according to claim 9, wherein the control unit creates a list showing a correspondence relation between the evaluation degree designated by the designating unit and the number of repetition times of the selecting process.

11. An image processing method comprising:
    obtaining a plurality of images from a storage medium;
    displaying the plurality of images obtained by the obtaining step on a display apparatus;
    executing a selecting process which is arranged to perform at least one of a selecting operation and a reserving operation the plurality of images;
    controlling the operating step and the display control step in such a manner, that after selecting the ranking operation or the reserving operation is executed to all of the plurality of images, the images to which the reserving operation is executed are displayed by the display control step, and the selecting process is repeated to the images to which the reserving operation is executed; and
    assigning a rank information to the plurality of images in accordance with the selecting process and recording the rank information related with the number of repetition times of the selecting process,
    wherein the selecting operation to be executed in each repetition of the selecting process is a same operation regardless of the number of repetition times of the selecting process, and
    wherein the rank information created to the image subjected to the selecting operation differs in accordance with the number of repetition times of the selecting process executed to the image.

12. A non-transitory computer-readable storage medium storing a computer program comprising a program code for causing a computer to function as a unit according to claim 1.

* * * * *